Patented Oct. 10, 1944

2,359,773

UNITED STATES PATENT OFFICE 2,359,773

UNSATURATED PREGNENOIC ACIDS AND PREPARATION OF SAME FROM HALO-STEROIDS

Russell Earl Marker, State College, Pa., and Harry M. Crooks, Jr., Detroit, Mich., assignors to Parke, Davis & Company, Detroit, Mich., a corporation of Michigan No Drawing. Original application September 4, 1941, Serial No. 409,590. Divided and this application November 23, 1942, Serial No. 466,674

16 Claims. (Cl. 260—397.1)

The invention relates to the preparation of $\Delta^{17}$-21-pregnenoic acids and derivatives from 20-keto pregnane compounds dihalogenated at ring D. The invention further relates to the preparation of androstane compounds from pregnane compounds.

This application is a division of our copending application, Serial No. 409,590, filed September 4, 1941. In said copending application we have described and claimed 17,21-dihalo-20-keto pregnane compounds. These compounds have in ring D the structure

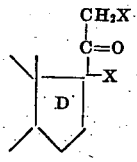

where X is chlorine or bromine.

In our copending application, Serial No. 460,000, filed September 28, 1942, we have described and claimed 16,17-dihalo-20-keto pregnane compounds having in ring D the structure

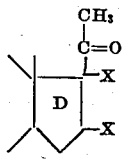

where X is chlorine or bromine.

Both of said classes of steroids which are dihalogenated in ring D may be unsubstituted in rings A, B and C or may bear substituents such as —OH, —O-acyl and —Hal and, furthermore, may have one or more points of unsaturation such, for example, as a double bond at $\Delta^5$. Regardless of these particular features in rings A, B and C, the invention of the present application resides in the treatment of the above mentioned dihalo steroids to form $\Delta^{17}$-21-pregnanoic acids or derivatives thereof and the conversion of the $\Delta^{17}$-21-pregnenoic acid compounds into 17-keto steroids, thus providing a method for preparing androstane compounds from pregnane compounds.

The terms androstane and pregnane as used in this specification and in the appended claims are to be understood as comprehending steroids of 19 and 21 carbon atoms respectively, regardless of the particular stereo-chemical configuration in the nucleus. For example, the term androstane compound is to be understood to include compounds having the "allo-" configuration at $C_5$ such as androsterone, or steroids having the "regular" configuration at $C_5$ such as etiocholanol-3($\beta$)-one-17, as well as ring-unsaturated steroids such as testosterone.

The treatment of a 17,21-dihalo-20-keto pregnane compound with strong alkali leads to the formation of a $\Delta^{17}$-21-pregnenoic acid or a derivative at the carboxyl group thereof. The reaction is best conducted in an alcoholic solution using a large excess of strong alkali. Under these conditions there is formed, along with free $\Delta^{17}$-21-pregnenoic acid, a quantity of the ester thereof with the alcohol used as a solvent. For example, methanolic potassium hydroxide and 17,21-dibromo-allo-pregnanone-20 yield $\Delta^{17}$-21-allo-pregnenoic acid together with some methyl $\Delta^{17}$-21-allo-pregnenoate. If the reaction is conducted in ethanol or propanol there is obtained, instead of the methyl ester, the ethyl ester or the propyl ester, respectively. Other strong bases may be used instead of potassium hydroxide, such as bases including sodium hydroxide, sodium ethylate, potassium methylate, etc.

The $\Delta^{17}$-21-pregnenoic acids are representable by the formula

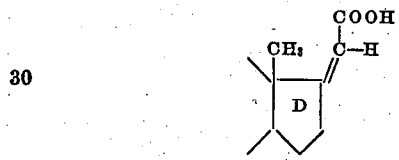

and constitutes a new and useful class of substances readily convertible into androstane compounds.

Functional derivatives of the carboxyl group of a $\Delta^{17}$-21-pregnenoic acid can be prepared by reactions commonly used for preparing such functional derivatives of organic carboxylic acids. Thus the new acids can be esterified by treatment with an alcohol and a catalyst, as may be illustrated by the preparation of ethyl $\Delta^{17}$-21-allo-pregnenoate by heating $\Delta^{17}$-21-allo-pregnenoic acid in ethanolic solution containing a small amount of concentrated sulfuric acid. Other esters, such as the methyl ester, the butyl ester, the benzyl ester, etc., may be prepared in a similar fashion. Again, the $\Delta^{17}$-21-pregnenoic acids may be converted into acid halides by treatment with inorganic acid halides, such as thionyl chloride, phosphorus tribromide, phosphorus pentachloride, etc. The acid halides of $\Delta^{17}$-21-pregnenoic acids can be converted into the corresponding amides, azides, phenylhydrazides, etc., by treatment with ammonia, sodium azide, phenylhydrazine, etc., respectively.

$\Delta^{17}$-21-pregnenoic acids are readily reduced with formation of 21-pregnenoic acids as follows:

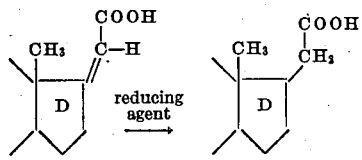

The above reduction can conveniently be effected by catalytic hydrogenation, for example, in acetic acid solution in the presence of a platinum catalyst. Another convenient mode of reduction is by means of sodium and alcohol.

An important reaction of the $\Delta^{17}$-21-pregnenoic acids is their oxidation to 17-keto-androstane compounds as follows:

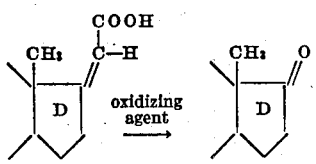

This oxidation can be effected by any agent capable of oxidatively rupturing carbon-to-carbon double bonds. Such agents include ozone, chromic anhydride, potassium permanganate and other oxidizing agents derived from chromic or permanganic acid. The oxidation may also be accompanied stepwise by first hydroxylating the double bond at C-17 and then oxidatively cleaving the resulting glycol. This two step oxidation can be achieved, for example, by treating the $\Delta^{17}$-21-pregnenoic acid first with hydrogen peroxide and then with periodic acid. Of all the modes of oxidation, the best appears to be the use of permanganates in alkaline media at about room temperature.

If double bonds are present in rings A, B or C, it is necessary to protect them during this oxidation by the careful partial addition of halogen, or hydrohalic acid, e. g., chlorine, bromine, hydrogen chloride or hydrogen bromide, using mild conditions so as not to saturate the $\Delta^{17}$-double bond. The protecting groups can be removed subsequent to the oxidation by treatment with a dehydrohalogenating agent or a dehalogenating agent, respectively. Suitable dehalogenating agents include sodium iodide in either alcohol or acetone, zinc and acetic acid, and careful partial hydrogenation in the presence of a platinum or palladium catalyst.

Whether ketone or hydroxyl groups which may be in rings A, B or C need to be protected during the oxidation depends on the oxidizing agent employed. If chromic acid or a derivative thereof is the oxidant, ketone groups are usually unaffected, while hydroxyl groups are oxidized to ketone groups. If it is desired to retain a hydroxyl group in the oxidation product, this hydroxyl group must be protected prior to oxidation, for example, by acetylation, benzoylation, etc. After oxidation, the protecting group can readily be removed by hydrolysis of the oxidation product.

If the oxidant is a permanganate in alkaline media, it is unnecessary to protect hydroxyl groups since these are not readily attacked by this reagent. On the other hand, ketone groups are prone to oxidation in this case. To protect them, they are reduced to hydroxyl groups, for example, with the combination of aluminum isopropylate and isopropyl alcohol.

The transformation of a 16,17-dihalo-20-keto pregnane compound into the $\Delta^{17}$-21-pregnenoic acid is best effected by an excess of strong alcoholic alkali. For example, there may be used methanolic potassium hydroxide, ethanolic sodium hydroxide or a solution of sodium in propyl alcohol. There is also frequently formed, besides the $\Delta^{17}$-21-pregnenoic acid, a relatively small amount of the ester of the $\Delta^{17}$-21-pregnenoic acid and the alcohol used as a solvent.

Our invention is of particular importance when the starting materials to be converted into the $\Delta^{17}$-21-pregnenoic acids are compounds of the formula

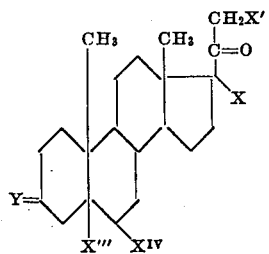

and compounds of the formula

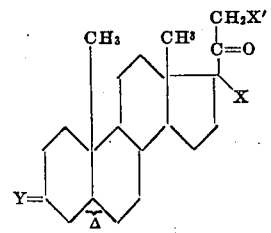

where X and X' are members of the class consisting of chlorine and bromine, X''' and X$^{IV}$ are members of the class consisting of chlorine, bromine and hydrogen, X$^{IV}$ being hydrogen when X''' is hydrogen and X''' being the same as X$^{IV}$ when the latter is one of the class chlorine and bromine, Y is a member of the class consisting of

groups hydrolyzable to

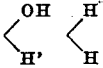

and (=O), and $\Delta$ represents a carbon-to-carbon double bond included between C$_5$ and one of C$_4$ and C$_6$.

This invention may be further illustrated by the following examples.

*Example 1*

A. *17-bromo-allo-pregnanone-20.*—To a solution of 10 g. of allo-pregnanone-20 in 200 cc. of glacial acetic acid is added 10 drops of concentrated hydrobromic acid and 33.2 cc. of a 1 M. (1 molar) solution of bromine in acetic acid. After standing fifteen minutes the solution is poured into water, extracted with ether and the ethereal extract washed free of acetic acid with water and dilute sodium carbonate solution. Evaporation of the ether gives a residue which is crystallized from ether-methanol and acetone to give crystals, M. P. 127–9° C., of 17-bromoallo-pregnanone-20. This product depresses the melting point of allo-pregnanone-20, M. P. 132°, by twenty degrees.

Anal. Calcd. for $C_{21}H_{33}OBr$: C, 66.2; H, 8.7. Found: C, 65.8; H, 8.8.

*B. 17,21 - dibromo - allo - pregnanone - 20.*—To 500 mg. of 17-bromo-allo-pregnanone-20 in 35 cc. of glacial acetic acid is added at 35° C. 2 drops of 45% aqueous hydrobromic acid and 1.3 cc. of 1.0 M. bromine in acetic acid. After standing for one hour the solution is diluted with water, filtered, and the solid washed with water. Crystallization from acetone yields a product melting at 128–130° C. This is 17,21-dibromo-allo-pregnanone-20.

Anal. Calcd. for $C_{21}H_{32}OBr_2$: C, 55.0; H, 6.6. Found: C, 54.8; H, 7.0.

*C. 17,21 - dibromo - allo - pregnanone-20.*—Instead of obtaining 17,21-dibromo-allo-pregnanone-20 as set forth above under Example 1A and B, it may be prepared as follows. To a solution of 5 g. of allo-pregnanone-20 in 100 cc. of glacial acetic acid is added 10 drops of concentrated hydrobromic acid and 33.2 cc. (2 mols) of a 1 M. solution of bromine in acetic acid, the rate of addition being governed by the speed of disappearance of the bromine color. To ensure complete reaction the solution is warmed to 40° C. during the addition of the second mol of bromine. The solution is allowed to stand for thirty minutes, then poured into 500 cc. of ice-water and filtered. The rather gummy precipitate is taken up in ether, washed with water and saturated sodium bicarbonate solution and the ether evaporated. The residue is crystallized from acetone to give 17,21-dibromo-allo-pregnanone-20, M. P. 128–30° C. This gives a depression when mixed with a sample of either 17-bromo-allo-pregnanone-20, M. P. 127° C. or allo-pregnanone-20, M. P. 132° C.

*D. $\Delta^{17}$-21-allo-pregnenoic acid.*—To a solution of 1.85 g. of 17,21-dibromo-allo-pregnanone-20 in 100 cc. of methanol is added a solution of 9.25 g. of potassium hydroxide in 85 cc. of hot methanol. The mixture is evaporated on the steam bath to a volume of approximately 50 cc. and an additional 100 cc. of methanol added. The solution is again evaporated to a volume of approximately 50 cc., cooled and shaken with 100 cc. of ether. The potassium salt which deposits is collected and washed with ether. The salt is slurried with water, acidified with hydrochloric acid and the solid taken up in ether. The ethereal extract is washed with water, and then the ether is evaporated. The residue is crystallized from ethyl acetate. Thus, there is obtained $\Delta^{17}$-21-allo-pregnenoic acid, M. P. 242–244° C.

Anal. Calcd. for $C_{21}H_{32}O$: C, 79.7; H, 10.1. Found: C, 79.5; H, 10.1.

*E. Oxidation of $\Delta^{17}$-21-allo-pregnenoic acid to androstanone-17.*—A solution of 1.0 g. of $\Delta^{17}$-21-allo-pregnenoic acid in 200 cc. of chloroform, cooled by an ice-hydrochloric acid bath, is ozonized by bubbling in, for sixteen minutes, a 7% ozone-93% oxygen mixture generated at the rate of 30.1 of gas per hour. The chloroform solution is stirred for one hour with 200 cc. of water and then heated on the steam bath for an additional hour. The solid product which has precipitated is taken up in ether, and the ethereal extract washed successively with dilute sodium carbonate solution and water. Then the ether is evaporated on the steam bath. The residue is dissolved in 50 cc. of methanol, an excess of a methanolic solution of semicarbazide acetate added, and the mixture was heated on the steam bath for one hour. The semicarbazone which deposits is collected, washed with water, dried and crystallized from chloroform. M. P. 284–285° C. dec. This is androstanone-17 semicarbazone.

To 350 mg. of the semicarbazone in 100 cc. of ethanol is added 3 cc. of concentrated sulfuric acid in 7 cc. of water. The mixture is refluxed for one hour and then diluted with water. The solid which precipitates is taken up in ether, the ethereal solution is washed and the ether is evaporated. The residue is crystallized from aqueous methanol to give androstanone-17 of M. P. 117–119° C.

*Example 2*

*A. 17-bromo-allo-pregnanol-3($\beta$)-one - 20.*—To a solution of 17 g. of allo-pregnanol-3($\beta$)-one-20 in 1 liter of acetic acid is added at room temperature, dropwise, 54 cc. of a 1 M. solution of bromine in acetic acid. The solution is allowed to stand ten minutes, and then 1 liter of water is added. The gummy precipitate is collected, taken up in ether, the ethereal layer washed well with water, and then evaporated. The residue is crystallized from aqueous methanol and from ether-pentane. The product, 17-bromo-allo-pregnanol-3($\beta$)-one-20, has M. P. 93–96° C.

Anal. Calcd. for $C_{21}H_{33}O_2Br$: C, 63.5; H, 8.4. Found: C, 63.6; H, 8.1.

*B. 17,21-dibromo-allo-pregnanol-3($\beta$) - one - 20 acetate.*—To a solution of 18 g. of 17-bromo-allo-pregnanol-3($\beta$)-one-20 in 1 liter of acetic acid is added, at 40° C. one equivalent of a 1 M. solution of bromine in acetic acid. After the bromine has reacted, the solution is diluted with water and the precipitate is taken up in ether. The ethereal layer is washed with water, dilute sodium carbonate solution, and finally with water. The ether is removed and the residue is crystallized from methanol. The purified 17,21-dibromo-allo-pregnanol-3($\beta$)-one-20 acetate has M. P. 174° C.

The esterification of the 3-OH during the reaction is probably due to the catalytic effect of the hydrogen bromide present.

*C. 3($\beta$)-hydroxy-$\Delta^{17}$-21-allo-pregnenoic acids.*—A solution of 1.5 g. of 17,21-dibromo-allo-pregnanol-3($\beta$)-one-20 acetate in 200 cc. of methanol is heated with 5 g. of potassium hydroxide on the steam bath for two hours. After adding water, the mixture is extracted with ether and the ethereal extract discarded. The aqueous layer is acidified and the precipitate taken up in ether. This ethereal extract is evaporated to dryness and the residue crystallized from methanol. The product, M. P. 249° C. is 3($\beta$)-hydroxy-$\Delta^{17}$-21-allo-pregnenoic acid.

*D. Androstanol-3($\beta$)-one - 17 from 3($\beta$)-hydroxy-$\Delta^{17}$-21-allo-pregnenoic acid.*—A chloroform solution of 6.7 g. of the acetate of 3($\beta$)-hydroxy-$\Delta^{17}$-21-allo-pregnenoic acid (prepared by refluxing 3($\beta$)-hydroxy-$\Delta^{17}$-21 - allo - pregnenoic acid with acetic anhydride, and then evaporating the excess anhydride) is treated with a stream of oxygen containing about 6% ozone (generated at the rate of 30 liters of gas per hour) for three hours. Then the chloroform solution is poured into 300 cc. of water and stirred for forty-five minutes. The mixture is heated on a steam bath until most of the chloroform has evaporated, after which the residual water layer is extracted with ether. The ethereal layer is separated, evaporated, and the residue hydrolyzed by refluxing with 6 g. of potassium hydroxide in 200 cc. of methanol for twenty minutes. Then the hydrolysate is diluted with water and the mixture extracted with ether. The ethereal layer is washed with water and then evaporated. The residue is dissolved in 200 cc. of ethanol and refluxed with 4 g. of semicarbazide hydrochloride and 5 g. of sodium acetate in 10 cc. of water for one hour. Then the mixture is diluted with water, the precipitate collected and washed with water and ether. This product is crystallized from ethyl alcohol-chloroform mixture, and then has M. P. 260–262° C. dec. It is androstanol-3($\beta$)-one-17 semicarbazone.

A suspension of 200 mg. of the above semicarbazone in 50 cc. of alcohol is refluxed with 50 cc. of alcohol containing 5 cc. of sulfuric acid and 10 cc. of water for one hour. Then an excess of water is added and the precipitate taken up in ether. The ethereal layer is separated, the ether evaporated, and the residue crystallized from aqueous methanol. The product, androstanol-3($\beta$)-one-17, has M. P. 172–174° C.

*Example 3*

A. *3-keto-$\Delta^{17}$-21-allo-pregnenoic acid.*—A mixture of 3 g. of 3($\beta$)-hydroxy-$\Delta^{17}$-21-allo-pregnenoic acid, 10 g. of aluminum t-butylate, 100 cc. dry toluene and 25 cc. of dry acetone is refluxed for six hours. Then the mixture is cooled, diluted with ether and dilute hydrochloric acid, and the ethereal layer separated. After washing the ethereal extract with water, the ethereal extract is evaporated in vacuo on a steam bath. The residue is 3-keto-$\Delta^{17}$-21-allo-pregnenoic acid. It may be purified by crystallization from dilute alcohol. However, it is unnecessary to purify it for use in the next step.

B. *3($\alpha$)-hydroxy-$\Delta^{17}$-21-allo-pregnenoic acid.*—The above residue of 3-keto-$\Delta^{17}$-21-allo-pregnenoic acid is refluxed with 200 cc. of dry isopropyl alcohol and 10 g. of aluminum isopropylate overnight. Then the mixture is slowly distilled through a short column over a period of about five hours, until about two-thirds of the alcohol has been removed. The residue is cooled, diluted with ether and dilute hydrochloric acid and the ethereal layer separated. The ethereal extract is washed with water and evaporated on the steam bath. The residue is crystallized from ether and from ethyl acetate to give 3($\alpha$)-hydroxy-$\Delta^{17}$-21-allo-pregnenoic acid of M. P. 232–235° C.

Anal. Calcd. for $C_{21}H_{32}O_3$: C, 75.9; H, 9.7. Found: C, 75.8; H, 9.7.

C. *Androsterone from 3($\alpha$)-hydroxy-$\Delta^{17}$-21-allo-pregnenoic acid.*—A solution of 1 g. of the above acid in 200 cc. of chloroform is ozonized after the method given in Example 1D and the product, androsterone, isolated by means of its semicarbazone, M. P. 260–264° dec.

A solution of 0.4 g. of the above semicarbazone in 50 cc. of alcohol containing 5 cc. of sulfuric acid and 10 cc. of water is refluxed for one hour. After the hydrolysis is complete, the mixture is diluted with water and extracted with ether. The ethereal layer is washed with water and then the ether is removed on the steam bath and the residue crystallized from aqueous methanol. Thus there is obtained androsterone (etio-allo-cholanol-3($\alpha$)-one-17) of M. P. 182–183° C.

*Example 4*

A. *17,21-dibromo-pregnanol-3($\beta$)-one-20 acetate.*—A solution of 5 g. of pregnanol-3($\beta$)-one-20 acetate in 150 cc. of glacial acetic acid containing 2 drops of 48% hydrobromic acid is warmed to 40° C. and then 29 cc. of 1 M. bromine in acetic acid is added dropwise. After the solution has stood for fifteen minutes it is poured into water and the precipitated solid collected and washed with water. The solid is recrystallized from acetone to give white crystals of 17,21-dibromo-pregnanol-3($\beta$)-one-20 acetate of M. P. 190–191° C.

Anal. Calcd. for $C_{23}H_{34}O_3Br_2$: C, 53.3; H, 6.6. Found: C, 52.9; H, 6.7.

B. *17,21-dibromo-pregnanol-3($\beta$)-one-20.*—To a solution of 10 g. of pregnanol-3($\beta$)-one-20 in 300 cc. of glacial acetic acid at 40° C. is added several drops of 48% hydrobromic acid. Then 62.6 cc. of 1 M. bromine in acetic acid is added dropwise. After the addition of bromine is completed, the solution is poured into water and the precipitated solid collected and washed with water. The solid is crystallized from ether to give thick white needles of 17,21-dibromo-pregnanol-3($\beta$)-one-20 of M. P. 190–192° C.

C. *3($\beta$)-hydroxy-$\Delta^{17}$-21-pregnenoic acid.*—To a solution of 1 g. of 17,21-dibromo-pregnanol-3($\beta$)-one-20 in 100 cc. of methanol is added a solution of 5 g. of potassium hydroxide in 5 cc. of water. Then the mixture is heated on a steam bath while allowing the methanol to evaporate at such a rate that after an hour of heating the volume is 20 cc. Then water is added and the mixture is extracted once with ether, the ethereal layer being rejected. The aqueous layer is acidified and warmed for five minutes. Then the mixture is cooled and extracted with ether. The ethereal extract is washed with water and then evaporated on the steam bath. The residue is crystallized from methanol to give white plates of 3($\beta$)-hydroxy-$\Delta^{17}$-21-pregnenoic acid, M. P. 257–258° C. dec.

The same acid may be obtained by treating 17,21-dibromo-3($\beta$)-one-20 acetate with alcoholic potassium hydroxide or sodium hydroxide according to the method given above.

3($\beta$)-hydroxy-$\Delta^{17}$-21-pregnenoic acid may be converted into its acetate by refluxing with acetic anhydride for about twenty minutes. An acetate is obtained which, after crystallization from methanol, has M. P. 234° C.

D. *Etio-cholanol-3($\beta$)-one-17.*—A mixture of 1.9 g. of 3($\beta$)-hydroxy-$\Delta^{17}$-pregnenoic acid and 30 cc. of acetic anhydride is refluxed for half an hour. Then the excess acetic anhydride is removed by distillation in vacuo and the residue is dissolved in 50 cc. of acetic acid. To this is added, dropwise, a solution of 4 g. of chromic anhydride in 50 cc. of 80 per cent acetic acid. The solution is allowed to stand at 50–55° C. for four hours after which the mixture is cooled and poured into water. The mixture is extracted with ether and the ethereal extract washed well with water and with 10% sodium hydroxide. Then the ether is evaporated and the residue heated for an hour with an excess of 5% alcoholic potassium hydroxide solution. The hydrolysate is cooled, diluted with water and extracted with ether. The ether is removed on a steam bath to leave a residue of crude etio-cholanol-3($\beta$)-one-17. The pure ketone is isolated from this as follows:

The residue, in 50 cc. of alcohol, is heated with 2 g. of semicarbazide hydrochloride and 3 g. of sodium acetate for one hour. Then water is added and the precipitated solid collected. After crystallization from alcohol the pure etio-cholanol-3(β)-one-17 semicarbazone has M. P. 241-243° C. dec. It may be hydrolyzed with alcoholic sulfuric acid to obtain etio-cholanol-3(β)-one-17 of M. P. 150-152° C.

Instead of oxidizing the 3(β)-hydroxy-$\Delta^{17}$-21-pregnenoic acid as in the above example, it may be oxidized with ozone according to the method given in Example 1E.

Example 5

A. *5,6,17,21-tetrabromo-pregnanol-3(β)-one-20 acetate.*—To a solution of 10 g. of $\Delta^5$-pregnenol-3(β)-one-20 acetate in 200 cc. of acetic acid is added 28.5 cc. of a 1 M. solution of bromine in acetic acid. Then a few drops of 48% hydrobromic acid are added, followed by an additional 57 cc. of 1 M. bromine in acetic acid. The solution is warmed to 40° C. to insure complete reaction and then the mixture is allowed to stand at room temperature. After several hours the solid which has deposited is collected and washed with ether. This is 5,6,17,21-tetrabromo-pregnanol-3(β)-one-20 acetate of M. P. 172° C. dec.

Anal. Calcd. for $C_{23}H_{32}O_3Br$: C, 40.8; H, 4.8. Found: C, 40.6; H, 4.8.

B. *17,21 - dibromo - $\Delta^5$-pregnenol-3(β) - one-20 acetate.*—A solution of 4.36 g. of sodium iodide in 100 cc. of alcohol is added to a boiling solution of 10 g. of 5,6,17,21-tetrabromo-pregnanol-3(β)-one-20 acetate in 1500 cc. of ethanol and the mixture boiled for an hour. Then water is added and the mixture is extracted with ether. The ethereal extract is washed with dilute sodium bicarbonate solution and with water and then the ether is removed on the steam bath. The residue is 17,21-dibromo-$\Delta^5$-pregnenol-3(β)-one-20 acetate. It may be purified by crystallization from dilute acetone. However, this is unnecessary if the substance is to be used in the next step.

C. *3-(β)-hydroxy-$\Delta^{5,17}$-21-pregnadienoic acid.*—The above residue of 17,21-dibromo-$\Delta^5$-pregnenol-3(β)-one-20 acetate is dissolved in 1000 cc. of methanol, a solution of 50 g. of potassium hydroxide in 50 cc. of water added, and the mixture refluxed for an hour. Then water is added and the mixture is extracted with ether. The ethereal extract is discarded. The aqueous alkaline layer is acidified and the organic acid which separates is taken up in ether. This ethereal extract is washed well with water and then the ether is removed on a steam bath. The residue is crystallized from acetone and then sublimed in a high vacuum at 200° C. to give pure 3-(β)-hydroxy-$\Delta^{5,17}$-21-pregnadienoic acid of M. P. 252-253° C.

*Reduction of 3(β)-hydroxy-$\Delta^{5,17}$-21-pregnadienoic acid.*—A mixture of 300 mg. of 3(β)-hydroxy-$\Delta^{5,17}$-21-pregnadienoic acid, 100 mg. of platinum oxide catalyst and 80 cc. of acetic acid is shaken with hydrogen at room temperature and 3 atmospheres pressure for two hours. Then the catalyst is removed by filtration and the filtrate evaporated to dryness in vacuo. The residue is crystallized from aqueous methanol to give 3(β)-hydroxy-21-allo-pregnanoic acid, M. P. 228-230° C.

D. *Dehydroisoandrosterone.*—A solution of 3 g. of 3(β)-hydroxy-$\Delta^{5,17}$-21-pregnadienoic acid in 40 cc. of acetic anhydride is refluxed for forty-five minutes and then the solution is evaporated to dryness in vacuo. The residue of 3(β)-acetoxy-$\Delta^{5,17}$-21-pregnadienoic acid is dissolved in 100 cc. of chloroform. This solution is cooled in an ice bath and treated over a period of an hour with a solution of 1.45 g. of bromine in 50 cc. of chloroform. Then a stream of ozonized oxygen is passed through the cold solution until no more ozone is absorbed. The solvent is now removed in vacuo below 30° C., and the residue is heated on a steam bath for one hour with 60 cc. of acetic acid and 3 g. of zinc dust. Then water is added, the mixture extracted with ether and the ethereal extract washed with sodium carbonate solution. The ether is removed on a steam bath to leave a residue of somewhat impure dehydroisoandrosterone. The pure ketone is best obtained as follows:

The residue, in 100 cc. of methanol, is heated for one hour with 3 g. of semicarbazide hydrochloride and 4.5 g. of sodium acetate. Then the mixture is diluted with water and the precipitated semicarbazone collected and purified by crystallization from alcohol-chloroform. M. P. 280° C. dec.

The above dehydroisoandrosterone semicarbazone is hydrolyzed by refluxing it with alcoholic sulfuric acid. The dehydroisoandrosterone thus obtained is crystallized from ether-pentane and then has M. P. 145-147° C.

Example 6

A. *Methyl 3(β)-hydroxy-$\Delta^{17}$-21-pregnenoate.*—An excess of a cold ethereal solution of diazomethane is added to an ethereal solution of 6 g. of 3(β)-hydroxy-$\Delta^{17}$-21-pregnenoic acid. After the solution has stood sixteen hours, the ether is removed on a steam bath and the residue is crystallized from methanol to give flat white plates of methyl 3(β)-hydroxy-$\Delta^{17}$-21-pregnenoate, M. P. 153-155° C.

B. *Methyl 3-keto-$\Delta^{17}$-21-pregnenoate.*—A mixture of 4 g. of methyl 3(β)-hydroxy-$\Delta^{17}$-21-pregnenoate, 20 g. of aluminum isopropylate, 200 cc. of dry toluene and 25 cc. of dry acetone is refluxed for six hours. Then the mixture is cooled, acidified with dilute hydrochloric acid and extracted with ether. The ethereal extract is washed with water and the ether removed on a steam bath to leave a residue of methyl 3-keto-$\Delta^{17}$-21-pregnenoate. It may be purified by treatment with Girard's reagent and crystallization of the ketonic fraction from dilute methanol. However, this is unnecessary if the material is to be used in the next step below.

C. *Methyl 3(α)-hydroxy-$\Delta^{17}$-21-pregnenoate.*—The residue of methyl 3-keto-$\Delta^{17}$-21-pregnenoate obtained above is refluxed with 200 cc. of dry isopropyl alcohol and 20 g. of aluminum isopropylate for sixteen hours. Then the solution is slowly distilled over a period of five hours through a short column until about 120 cc. of distillate have been collected. The residue is cooled, acidified with dilute hydrochloric acid and extracted with ether. The ether is removed on a steam bath and the residue suspended in water and steam distilled to remove steam-volatile condensation products. Then the residual liquor, containing suspended gummy material, is extracted with ether and the ethereal extract evaporated to dryness. The residue is dissolved in 500 cc. of hot methanol and to it is added a hot solution of 12 g. of digitonin in 1 liter of 90% methanol. The next day the digitonide is filtered and the filtrate evaporated to a small volume. To this is added several hundred cc. of ether and the resulting solution is filtered, washed with water and the ether evaporated on a steam bath leaving a residue which is methyl 3($\alpha$)-hydroxy-$\Delta^{17}$-21-pregnenoate. It may be purified by crystallization from dilute methanol.

D. *Etio-cholanol-3($\alpha$)-one-17.*—A solution of the above residue of methyl 3($\alpha$)-$\Delta^{17}$-21-pregnenoate in 200 cc. of chloroform is chilled and a stream of ozonized oxygen bubbled through the solution until no more ozone is absorbed. This requires about fifteen minutes if the ozone content of the gas mixture is about 7% and if the gas is being delivered at a rate of 30 liters per hour. To the chloroform solution is added about 200 cc. of water and the mixture is heated on a steam bath until all the chloroform has evaporated. Then the residual aqueous liquor is extracted with ether, the ethereal extract washed well with potassium hydroxide solution and water, and the ether removed on a steam bath. The ketone is best isolated from the crude product thus obtained by converting the ketone into its semicarbazone after the manner described in Example 1. Thus there is obtained etio-cholanol-3($\alpha$)-one-17 semicarbazone, which after crystallization from alcohol has M. P. 235° C. dec. This semicarbazone may be hydrolyzed with alcoholic sulfuric acid to yield etio-cholanol-3($\alpha$)-one-17 of M. P. 147° C.

*Example 7*

A. *16,17-dibromo-pregnanol-3($\beta$)-one-20 acetate.*—To a solution of 5 g. of $\Delta^{16}$-pregnenol-3($\beta$)-one-20 acetate in 200 cc. of acetic acid is added 14 cc. of a 1 M. solution of bromine in acetic acid. Then the mixture is diluted with water and the precipitated solid collected and crystallized from methanol. The product, M. P. 137–140° C., gives the following analysis:

Anal. Calcd. for $C_{23}H_{34}O_3Br_2$: C, 53.3; H, 6.6. Found: C, 53.5; H, 6.7.

These analytical figures correspond to a dibromo-pregnanolone acetate. Accordingly it is believed that the above product is 16,17-dibromo-pregnanol-3($\beta$)-one-20 acetate representable by the formula

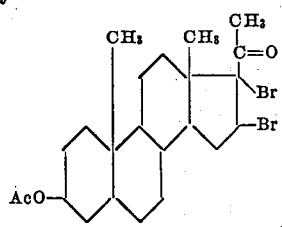

B. *Reaction of methanolic potassium hydroxide with 16,17-dibromo-pregnanol-3($\beta$)-one-20 acetate.*—A solution of 5 g. of 16,17-dibromo-pregnanol-3($\beta$)-one-20 acetate and 25 g. of potassium hydroxide in 1 liter of methanol is refluxed for one hour. Then water is added and the mixture is extracted with ether. In this way there is obtained two fractions which may be designated "the aqueous alkaline phase" and "the neutral ethereal phase." These two fractions are worked up as follows:

a. *The aqueous alkaline phase.*—The aqueous alkaline phase is acidified with dilute hydrochloric acid and extracted with ether. The ethereal solution is washed with water and evaporated to dryness. The crystalline residue is recrystallized from methanol to give 3($\beta$)-hydroxy-$\Delta^{17}$-21-pregnenoic acid of M. P. 254–256° C. dec. This product is identical with the product of Example 4C.

b. *The neutral ethereal phase.*—The neutral ethereal extract is evaporated to dryness and the crystalline residue is recrystallized from methanol. Thus there is obtained methyl 3($\beta$)-hydroxy-$\Delta^{17}$-21-pregnenoate of M. P. 153–156° C.

What we claim as our invention is:

1. Process for the preparation of a steroid having in ring D the structure

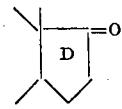

which comprises treating a 20-keto pregnane compound having at ring D a structure of the class consisting of

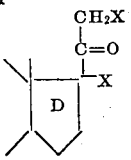

and

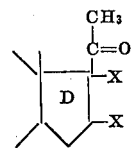

where X is a member of the class consisting of Cl and Br, with strong alkali in the presence of an alcohol thereby forming an unsaturated steroid having at ring D the structure

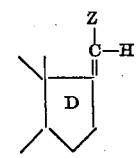

where Z is a member of the class consisting of —COOH and groups hydrolyzable thereto, and oxidizing said unsaturated steroid with an agent capable of oxidatively rupturing carbon-to-carbon double bonds.

2. Process for the preparation of a steroid having in ring D the structure

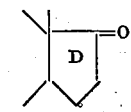

which comprises treating a 20-keto pregnane compound having at ring D a structure of the class consisting of

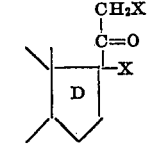

and

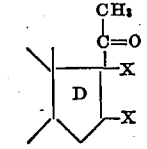

where X is a member of the class consisting of Cl and Br, with strong alkali thereby forming a pregnenoic acid having in ring D the formula

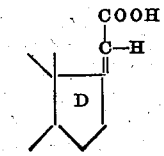

and oxidizing said pregnenoic acid with an agent capable of oxidatively rupturing carbon-to-carbon double bonds.

3. Process according to claim 1 wherein the oxidizing agent for treating said unsaturated steroid is of the class consisting of ozone, chromic anhydride, potassium permanganate and oxidizing agents derived from chromic and permanganic acids.

4. Process according to claim 2 wherein the oxidizing agent for treating said pregnenoic acid is of the class consisting of ozone, chromic anhydride, potassium permanganate and oxidizing agents derived from chromic and permanganic acids.

5. Process for the preparation of an unsaturated steroid having at ring D the formula

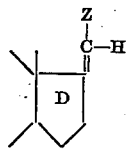

where Z is a member of the class consisting of —COOH and groups hydrolyzable thereto which comprises treating a 20-keto pregnane compound having at ring D a structure of the class consisting of

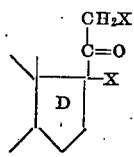

and

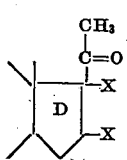

where X is a member of the class consisting of Cl and Br, with strong alkali in the presence of an alcohol.

6. Process for the preparation of an unsaturated steroid having at ring D the structure

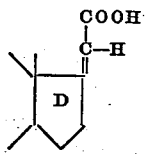

which comprises subjecting to strong alkali treatment a 20-keto pregnane compound having at ring D a structure of the class consisting of

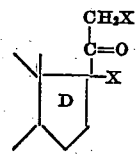

and

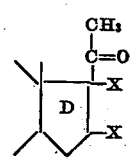

where X is a member of the class consisting of Cl and Br.

7. Process for the preparation of an unsaturated steroid having at ring D the structure

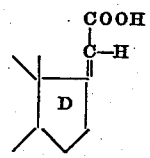

which comprises subjecting to strong alkali treatment a 20-keto pregnane compound having at ring D the structure

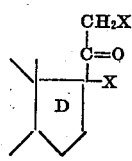

where X is a member of the class consisting of the middle halogens, chlorine and bromine.

8. Process for the preparation of an unsaturated steroid having at ring D the structure

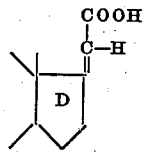

which comprises subjecting to strong alkali treatment a 20-keto pregnane compound having at ring D the structure

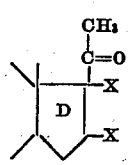

where X is a member of the class consisting of the middle halogens, chlorine and bromine.

9. An unsaturated steroid having in ring D the formula

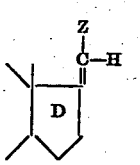

where Z is a member of the class consisting of —COOH and groups hydrolyzable thereto.

10. An unsaturated steroid having in ring D the formula

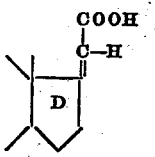

11. A steroid of the class consisting of 3($\beta$)-hydroxy-$\Delta^{17}$-21-pregnenoic acid and its C-21 esters.

12. A steroid of the formula

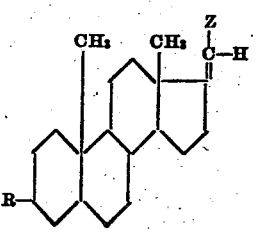

where R is a member of the class consisting of

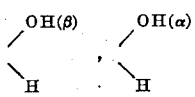

and =O and Z is a member of the class consisting of —COOH and groups hydrolyzable thereto.

13. A steroid of the class consisting of 3($\beta$)-hydroxy-$\Delta^{5,17}$-21-pregnadienoic acid and its C-21 esters.

14. A steroid of the class consisting of 3($\alpha$)-hydroxy-$\Delta^{17}$-21-pregnenoic acid and its C-21 esters.

15. Process for the preparation of a steroid having at ring D the structure

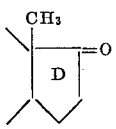

which comprises oxidizing an unsaturated steroid having at ring D the structure

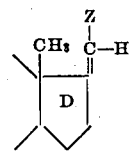

where Z is a member of the class consisting of —COOH and groups hydrolyzable thereto with an agent capable of oxidatively rupturing carbon-to-carbon double bonds.

16. Process according to claim 15 wherein the oxidizing agent for treating said unsaturated steroid is of the class consisting of ozone, chromic anhydride, potassium permanganate and oxidizing agents derived from chromic and permanganic acids.

RUSSELL EARL MARKER.
HARRY M. CROOKS, Jr.